United States Patent [19]
Tani

[11] Patent Number: 5,963,663
[45] Date of Patent: Oct. 5, 1999

[54] LAND MARK RECOGNITION METHOD FOR MOBILE ROBOT NAVIGATION

[75] Inventor: Jun Tani, Tokyo, Japan

[73] Assignee: Sony Corporation, Tokyo, Japan

[21] Appl. No.: 08/887,709

[22] Filed: Jul. 3, 1997

[30] Foreign Application Priority Data

Jul. 8, 1996 [JP] Japan .................................. 8-177577

[51] Int. Cl.$^6$ .................................................. G06K 9/00
[52] U.S. Cl. ......................................................... 382/153
[58] Field of Search .................................. 382/153, 155, 382/152, 103, 166, 165, 251–254; 707/11, 22, 24, 27, 80, 81, 84

[56] References Cited

U.S. PATENT DOCUMENTS 5,253,302 10/1993 Massen .................................. 382/100
5,301,257 4/1994 Tani ......................................... 395/11
5,504,841 4/1996 Tani ......................................... 395/81

OTHER PUBLICATIONS

"Cognition and Autonomy of Robots: A Dynamical Systems Perspective", Jun Tani, Nippon Robot Gakkaishi, vol. 14, No. 4, pp. 474–477, 1995, (Translation included).

J. Tani, "Model–Based Learning for Mobile Robot Navigation from the Dynamical Systems Perspective," IEEE Transactions on Systems, Man, and Cybernetics–Part B: Cybernetics, vol. 26, No. 3, Jun. 1996, pp. 421–436.

*Primary Examiner*—Jose L. Couso
*Assistant Examiner*—Duy M. Dang
*Attorney, Agent, or Firm*—Limbach & Limbach L.L.P.

[57] ABSTRACT

A land mark recognition apparatus presenting an enhanced learning capability with its neural net. Color image data of a land mark picked up by a television camera is quantized in the space defined by hue and chroma. Specifically, the color image data defined by hue and chroma falls within an area A1, the data is quantized as red data. Similarly, color image data falls within areas A3 and A3, the data is quantized as green and blue data, respectively. The color image data, after being quantized into a small number of data, is stored in the neural net.

9 Claims, 6 Drawing Sheets

LAND MARK RECOGNITION METHOD FOR MOBILE ROBOT NAVIGATION

BACKGROUND OF THE INVENTION

1. Field of the Invention

The present invention relates to an object recognition method for a mobile robot navigation, and more particularly, to a recognition method for recognizing quickly and reliably a land mark.

2. Description of the Related Art

Mobile robots are occasionally used to transport objects in plants. Guide lines are typically embedded in the ground or the floor inside the building of a plant, and a robot guides itself to its destination following the guide line. In this way, the robot moves to its destination with no operator intervention required.

In this case, however, the robot is allowed to follow a fixed robot path only, and if any unexpected obstacle lies in the path, the robot is unable to reach its destination.

To cope with such a situation, methods have been proposed which allow the robot to temporarily deviate from the guide line to evade an obstacle and then return back on the right track, when the obstacle lies in the middle of the track.

In this conventional method, since the robot follows the guide line, in principle, the construction of the guide line is essential. In the event of a layout modification of facilities in a plant, the guide line also needs modifying to match the new layout. Such a modification presents a great deal of difficulty in most cases.

Methods have also been proposed to allow a robot to receive a radio wave, for example, transmitted from a destination, and guide it in the direction in which the radio wave is coming. Since such a system needs to determine an absolute position within the workspace of the robot, the area in which the robot is able to move is limited and the entire system for robot navigation becomes a large and costly one.

It is then contemplated that, with a land mark (a sign) arranged, a robot is designed to autonomously travel referring to the land mark. With this arrangement, the robot may recognize the land mark using a television camera, for example, and allowed to move along a free robot path in a relatively simple fashion.

To autonomously move referring to the land mark, the robot needs to recognize the land mark. The land marks are conventionally formed to a predetermined standard shape to help the robot to easily recognize them. The output from a television camera is processed to determine whether each land mark matches the predetermined standard shape.

If associative memory is used to learn pixel images to determine whether a shape picked up matches a predetermined shape, the problem of a memory capacity limitation arises. Furthermore, similarly shaped land marks may be confusing to the robot.

SUMMARY OF THE INVENTION

Accordingly, it is an object of the present invention to provide an object recognition method for storing a large number of reference objects (land marks) and recognizing distinctly even similarly shaped reference objects.

According to a first aspect of the present invention, an object recognition apparatus comprises:

imaging means for imaging a reference object to be recognized, and outputting color image data corresponding the reference object, quantizing means for quantizing individually the color image data of the reference object output by the imaging means, as data falling within one of segmented areas of a finite number in a predetermined color space, storage means for learning and then storing, on an area-by-area basis, the individually quantized data provided by the quantizing means, comparison means for comparing, on an area-by-area basis, the area-by-area quantized data stored individually in the storage means with the area-by-area quantized data provided by the quantizing means, and determining means for exclusively determining a particular reference object based on the comparison result provided by the comparison means that makes comparisons on an area-by-area basis.

According to a second aspect of the present invention, an object recognition method comprising the steps of:

quantizing means for quantizing individually color image data which is obtained by imaging a reference object to be recognized, as data falling within one of segmented areas of a finite number in a predetermined color space, learning and then storing the individually quantized data provided by the quantizing means, on an area-by-area basis, comparing, on an area-by-area basis, the area-by-area quantized data stored individually with the area-by-area quantized data obtained through imaging, and exclusively determining a particular reference object based on the comparison result resulting from the area-by-area basis comparison.

In the object recognition apparatus and method according to the first and second aspects of the present invention, the color image data of an object is quantized into data in the space of hue and chroma. The quantized data of the object to be recognized is individually stored. The quantized data of the object being imaged is compared with the quantized data already stored.

DESCRIPTION OF THE PREFERRED EMBODIMENTS

Figure 1:
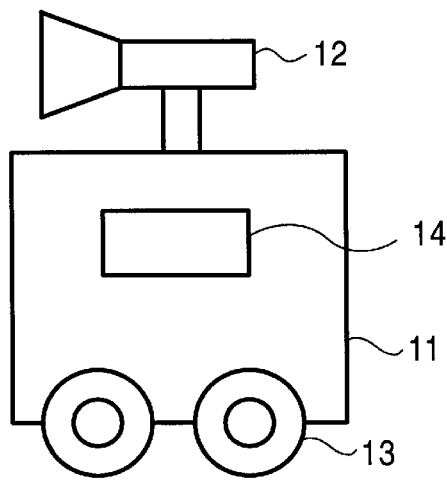
FIG. 1 is a diagrammatic external view of a robot in which the object recognition apparatus of the present invention is incorporated.

FIG. 1 is a diagrammatic external view of a mobile robot which incorporates the object recognition apparatus of the present invention and is capable of moving autonomously in its path. In this embodiment, a television camera 12 is mounted on the top of the robot 11 to image the environment surrounding it. The robot 11 has wheels 13 provided on its bottom to allow itself to move around to an arbitrary position. The robot 11 has also a display 14 provided on its side to present predetermined characters and images on screen.

Figure 2:
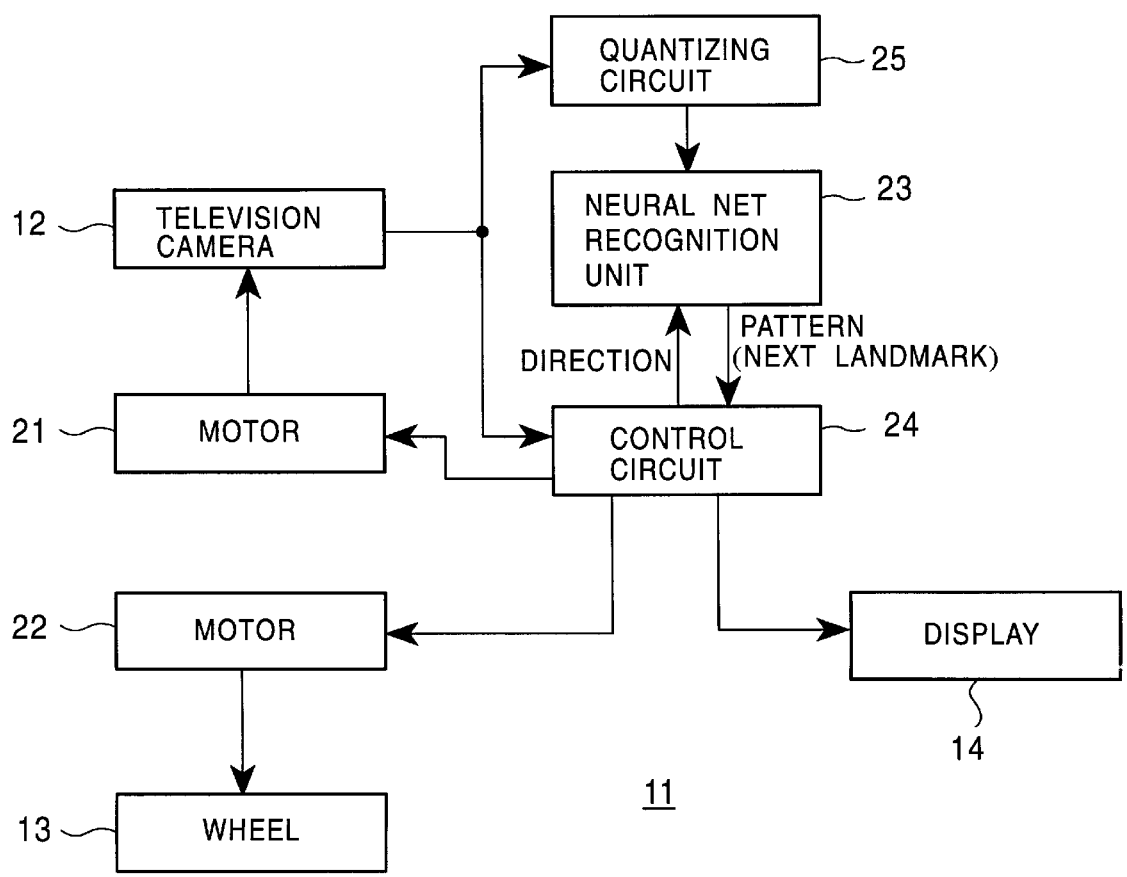
FIG. 2 is a block diagram showing the construction of the embodiment shown in FIG. 1.

FIG. 2 is a block diagram showing the construction of the robot 11. The television camera 12 picks up the image of the environment as a color image, and outputs a corresponding color image data to a control circuit 24 and a quantizing circuit 25. The quantizing circuit 25 quantizes input color image data and outputs quantized color image data to a neural net recognition unit 23. The neural net recognition unit 23 recognizes a land mark to be described later from among the color image data input from the quantizing circuit 25 (quantizing means), and outputs a recognition result to the control circuit 24. The control circuit 24, typically constructed of a microcomputer, notifies the neural net recognition unit 23 of the direction of travel of the robot 11 while presenting, on a display 14 constructed of a CRT, an LCD or the like, a prediction result about a next land mark provided by the neural net recognition unit 23.

The control circuit 24 controls a motor 21 so that the television camera 12 is aimed at a desired direction. The control circuit 24 controls a motor 22 to drive the wheels 13 so that the robot 11 travels to a desired position.

Figure 3:
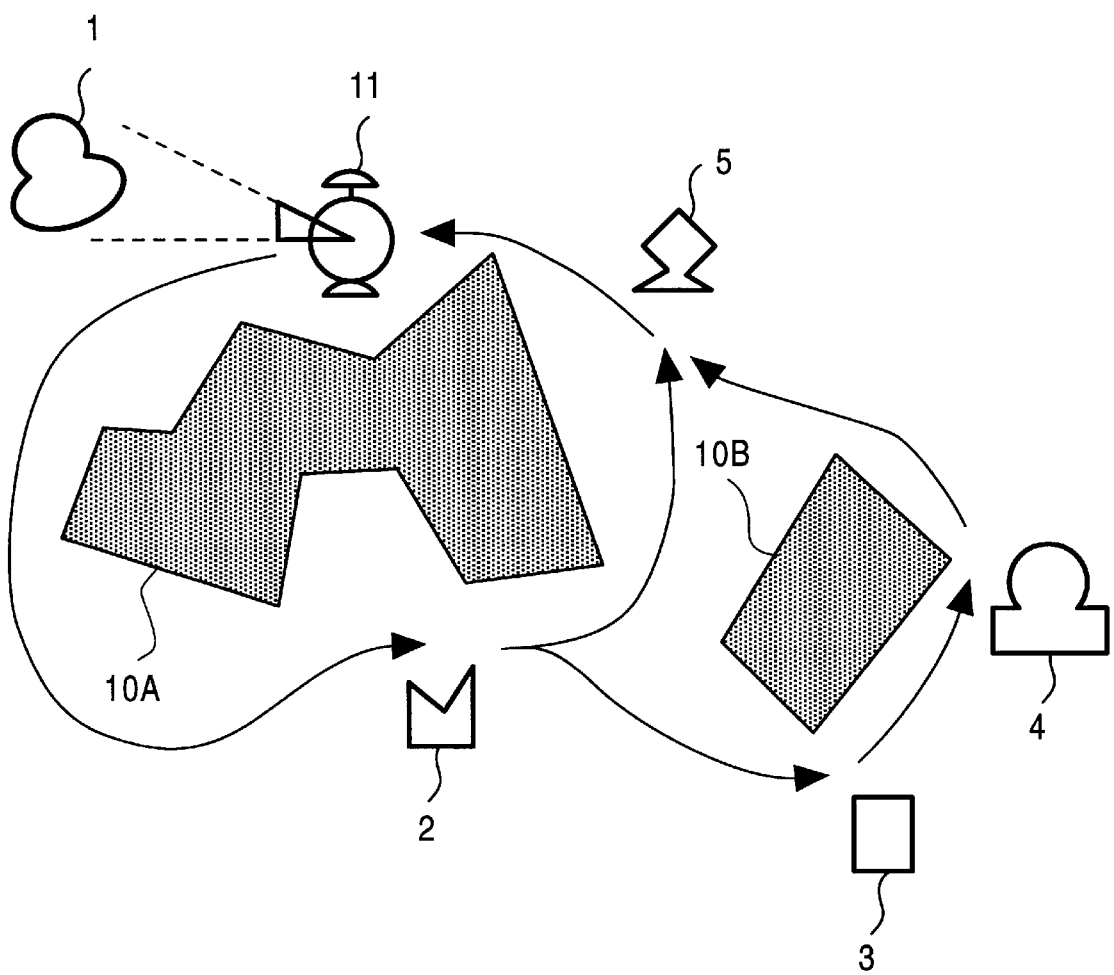
FIG. 3 illustrates the workspace for the embodiment shown in FIG. 1.

FIG. 3 is a plan view of the workspace of the robot 11. In this embodiment, land marks 1 through 5 are arranged around obstacles 10A and 10B for the robot 11 to recognize its present position. The robot 11 moves around the obstacle 10A along a counterclockwise path, past the land mark 1, land mark 2 and land mark 5, or moves around the obstacles 10A and 10B along another counterclockwise path, past the land mark 1, land mark 2, land mark 3, land mark 4 and land mark 5.

Figure 4:
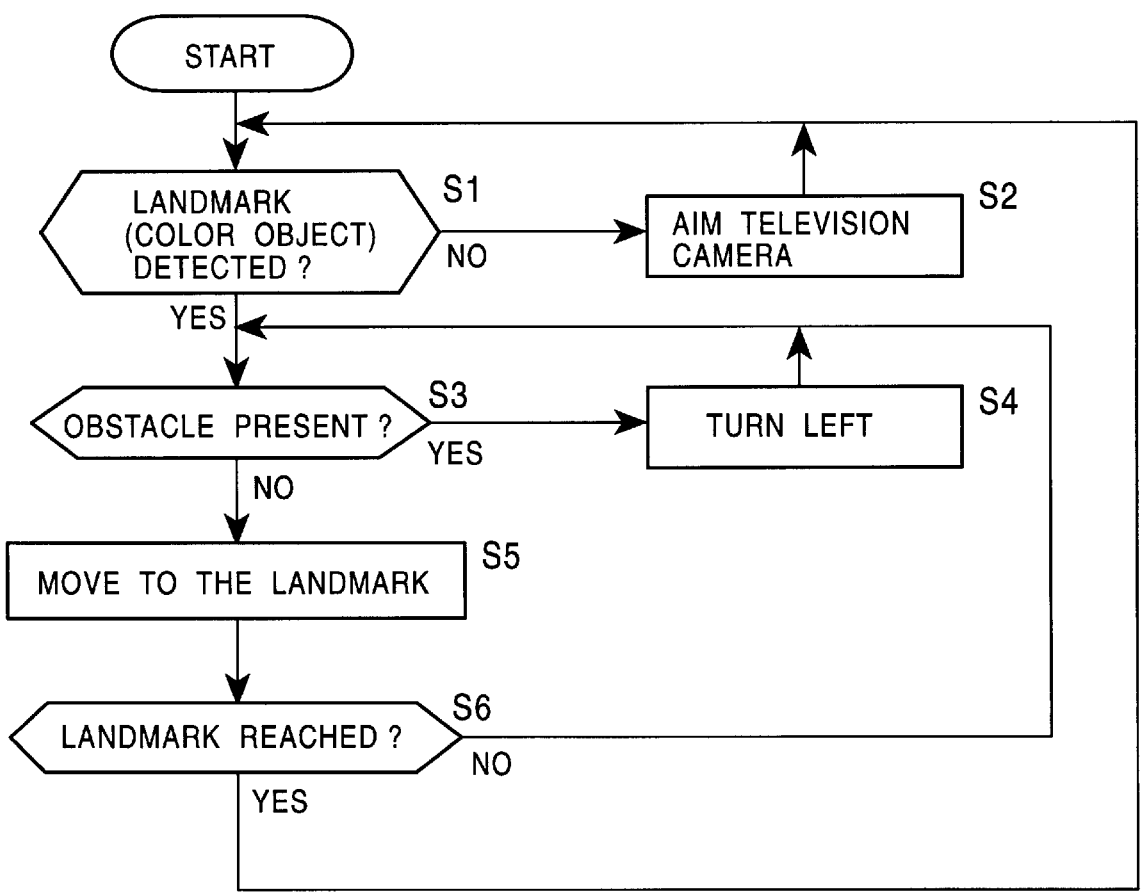
FIG. 4 is a flow diagram illustrating the operation of the control circuit shown in FIG. 2.

In the meantime, the control circuit 24 executes the process illustrated in FIG. 4. In step S1, the control circuit 24 first determines whether any land mark is detected. More particularly, the television camera 12 picks up the image of the environment, and outputs color image data resulting from image pickup to both the control circuit 25 and neural net recognition unit 23. Upon recognizing a land mark, the neural net recognition unit 23 sends its recognition result to the control circuit 24, as will be described later. The control circuit 24 monitors the output of the neural net recognition unit 23 to determine whether any land mark is detected. When any land mark is not yet detected, the control circuit 24 goes to step S2 where it controls the motor 21 to aim the television camera 12 at any desired direction or controls the motor 22 to drive the wheels 13 so that the robot 11 moves counterclockwise around the obstacles 10A and 10B as shown in FIG. 3. Steps S1 and S2 are repeated until any land mark is detected in step S1.

When the control circuit 24 determines in step S1 that a land mark is detected, the control circuit 24 goes to step S3 where the control circuit 24 determines whether any obstacle lies in the direction to the detected land mark. More particularly, the control circuit 24 determines the presence of any obstacle from the output provided by the television camera 12, and when it determines that an obstacle is present, the control circuit 24 goes to step S4 where an operation for turning the wheels 13 right is carried out. More particularly, the control circuit 24 controls the motor 22 to drive the wheels 13 to steer to the right (clockwise direction).

The control circuit 24 returns to step S3 where a determination is made of whether any obstacle is present in a new direction the robot 11 now takes. When the determination reveals the presence of an obstacle, the control circuit 24 goes to step S4 again where an operation for turning the robot 11 around clockwise further is performed. When no obstacle is found in step S3, the control circuit 24 goes to step S5. The control circuit 24 moves the robot 11 toward the land mark detected in step S1. More particularly, the control circuit 24 controls the motor 22 to drive the wheels 13 so that the robot 11 moves to the land mark.

The control circuit 24 goes to step S6. Based on the output of the television camera 12 and the output of neural net recognition unit 23, the control circuit 24 determines whether the land mark is reached. More particularly, the control circuit 24 determines that the land mark has been reached, when it receives from the neural net recognition unit 23 a signal indicating that the land mark is detected and when the television camera 12 outputs a sufficiently large land mark image. When the land mark is not yet reached, the control circuit 24 returns to step S3, and the subsequent steps described above are repeated. When the determination in step S6 reveals that the land mark has been reached, the control circuit 24 returns to step S1. The same process is repeated until a new land mark is detected and reached.

In this way, the robot 11 runs toward the land mark 1 without impacting the obstacle 10A, and when it reaches the land mark 1, the robot 11 then starts traveling from there to the land mark 2. When the robot 11 reaches the land mark 2, it starts traveling from there to the land mark 5. When the robot 11 reaches the land mark 5, it starts traveling from there to the land mark 1.

Or when the robot 11 reaches the land mark 2, it starts traveling to the land mark 3 rather than to the land mark 5. When the robot 11 reaches the land mark 3, it starts traveling from there to the land mark 4. When the robot 11 reaches the land mark 4, it starts traveling from there to the land mark 5.

The control circuit 24 may program which one of the above two robot paths for the robot 11 to take.

Figure 5:
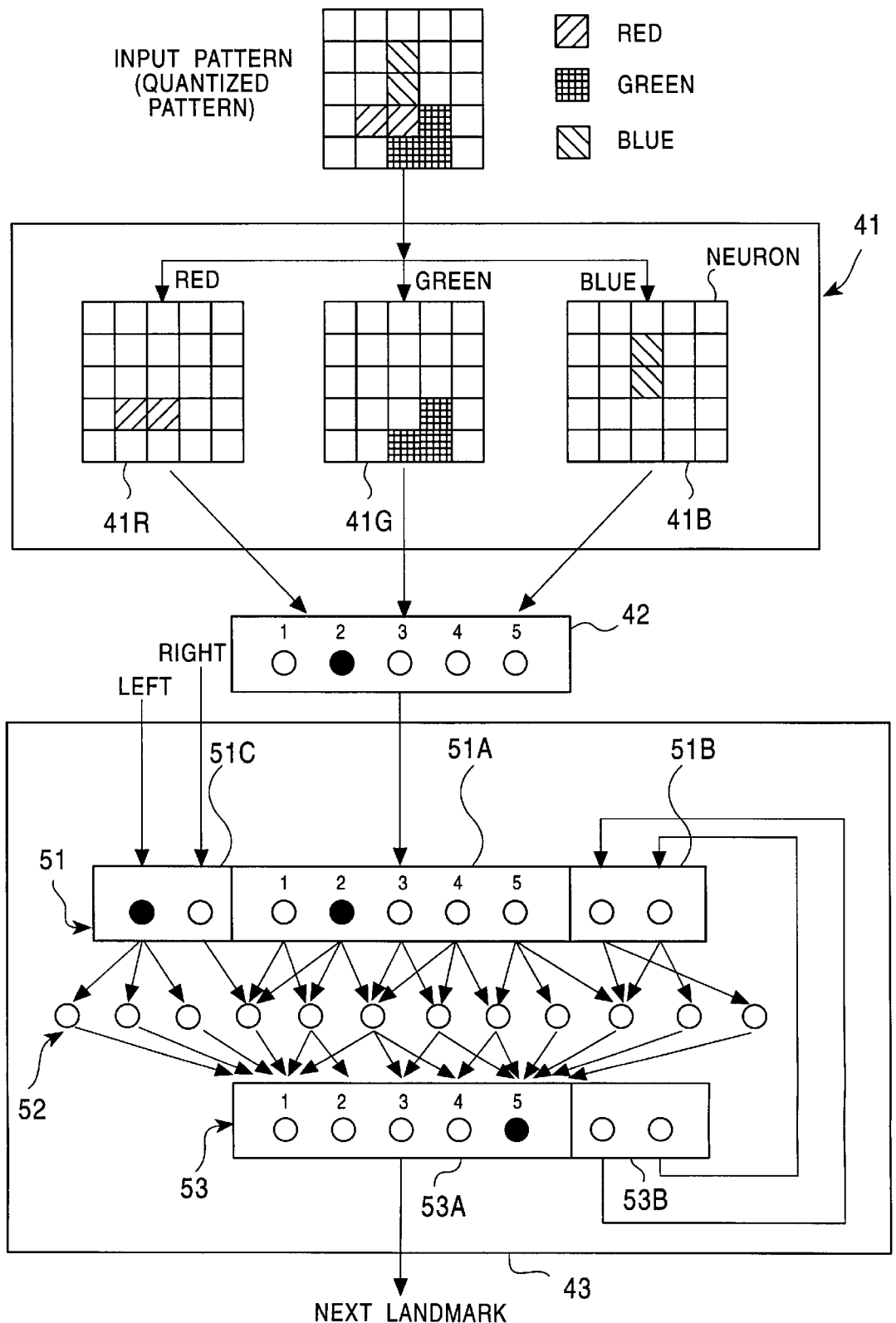
FIG. 5 is a detailed block diagram showing the neural net recognition unit 23 shown in FIG. 2.

The construction of the neural net recognition unit 23 is now discussed. As shown in FIG. 5, the neural net recognition unit 23 includes an associative memory net 41 (storage means and comparison means) constructed of a Hopfield neural net, a winner-take-all neural net 42 and recurrent neural net 43.

Relative to the Hopfield neural network that is one type of interconnection type neural networks, there are proposed applications to optimization represented by a problem of salesman's round, and also to an associative memory where a complete pattern is recalled from an incomplete input pattern.

Applications of the recurrent neural network in the learning process of the mobile robot are disclosed in a paper entitled "Cognition and Autonomy of Robots: a Dynamical Systems Perspective" authored by J. Tani in Journal of the Robotics Society of Japan, Vol. 14, No. 4, pp. 474 to 477, 1996 and "Model-Based Learning for Mobile Robot Navigation from the Dynamical Systems Perspective" authored by J. Tani, IEEE Trans. System, Man and Cybernetics Part B: Cybernetics, Vol. 26, No. 3, June 1996.

Figure 6:
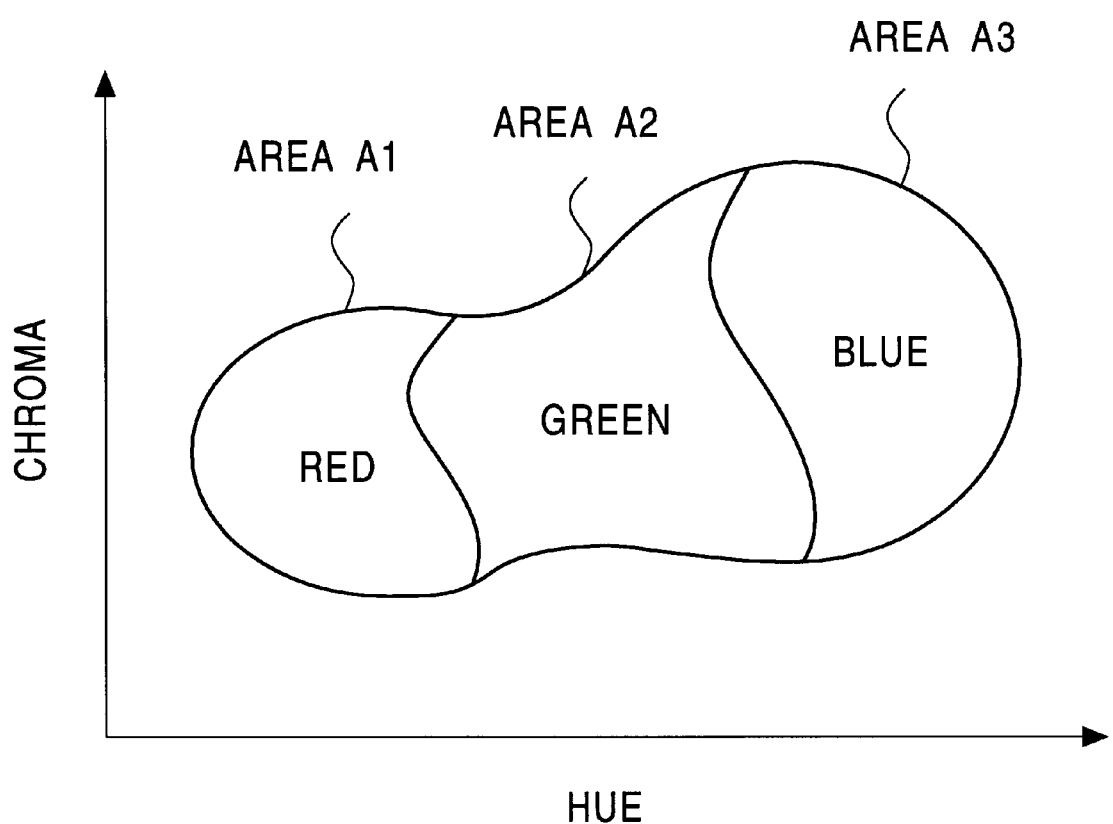
FIG. 6 is an explanatory view illustrating the operation of the quantizing circuit 25 shown in FIG. 2.

Before being sent to the associative memory net 41, the color image data output by the television camera 12 is fed to the quantizing circuit 25 to be quantized there. More particularly, the quantizing circuit 25 has a space (table) defined by hue and chroma from among the three attributes of colors, hue (type of color), chroma (density of color measured by the extent from a gray to a pure color), and brightness as shown in FIG. 6. The color image data defined by hue and chroma and falling within an area A1 are all "red" data. Similarly, the color image data falling within an area A2 is quantized as "green" data, and the color image data falling within an area A3 is quantized as "blue" data. Color image data is individually quantized as data falling within any of a finite number of segmented areas, for example, A1, A2 and A3.

The names red, green and blue designates data for convenience of explanation. Other alternative names are acceptable. These are mere codes (designating quantized data).

Color image data existing in the space defined by hue and chroma is infinite. In this embodiment, however, color image data is quantized into three. Quantizing a large number of color image data into a small number of data enables a neural net to learn and recognize an object. The data into which the quantizing circuit 25 quantizes the color image data is fed to the neural net recognition unit 23. The quantized data input to the neural net recognition unit 23 become one of data represented by three quantized data defined by the space shown in FIG. 6.

Referring to FIG. 5, the associative memory net 41 has fields, the number of which corresponds to the number of quantization steps shown in FIG. 6 (three steps in this embodiment). A field 41R corresponds to the red quantized data in the area A1 in FIG. 6, a field 41G corresponds to the green quantized data in the area A2 in FIG. 6, and a field 41B corresponds to the blue quantized data in the area A3 in FIG. 6. The input pattern constructed of three quantized data provided by the quantizing circuit 25 is input to the neurons of the respective fields of the associative memory net 41 (for memory recall).

Let U represents the internal state of each neuron, the following equation holds true:

$$U_i^{t+1} = k \cdot U_i^t + a\left(\sum_j W_{ij} \cdot a_j^t\right) \quad (1)$$

where i denotes a neuron number, and t denotes a given time. Thus, $U_i^{t+1}$ represents the internal state of i-th neuron at time t+1.

k denotes a damping constant, and a denotes a constant.

$W_{ij}$ denotes a connectivity weight from the i-th neuron to a j-th neuron. $a_j^t$ denotes the output of the j-th neuron at time t. This output is expressed as follows:

$$a_j^{t+1} = \text{logistic}\left(\frac{U_j^{t+1}}{T}\right) \quad (2)$$

where logistic (A) means that A is multiplied by a sigmoid function, and T is a constant. Equation 2 means that the output of the neuron is obtained by multiplying, by the sigmoid function, the result of the division of the internal state of the neuron by the constant T.

In this way, three quantized data are individually compared in terms of the fire condition of each neuron in the associative memory net 41 to perform recall dynamics (by comparison means), and learning dynamics are expressed by the following equation:

$$W_{ij}^{t+1} = W_{ij}^t + \epsilon\sum_{ij}(a_i - 0.5)(a_j - 0.5) \quad (3)$$

where the number 0.5 functions as a threshold. More particularly, the output of each neuron is an active value ranging between 0 and 1, and for an active value smaller than 0.5, the connectivity weight is set negative and for an active value greater than 0.5, the connective weight is set positive.

When the neural net learns the land marks 1 to 5 as reference objects for recognition, the result from the learning is stored as the connectivity weight $W_{ij}$ (by storage means).

The winner-take-all neural net 42 comprises neurons, the number of which corresponds to at least the number of land marks to be recognized (five neurons in this embodiment), and when the winner-take-all neural net 42 receives active values from the fields 41R, 41G and 41B, it performs learning process in which the output of one neuron, out of the five neurons, giving a maximum active value is set to 1.0 while the outputs of the remaining four neurons are set to 0.0. In this way, a single land mark is determined on a winner-take-all basis, based on the output pattern resulting from individual comparison in each of the three fields 41R, 41G, and 41B of the associative memory net 41. Thus, only the single neuron corresponding to the land mark is thus fired.

Since the winner-take-all neural net 42 allows a single neuron to exclusively fire on a winner-take-all basis, the subsequent recurrent neural net 43 for processing the output thereof is simplified.

The recurrent neural net 43 generally comprises an input layer 51, an intermediate layer 52, and an output layer 53. The input layer 51 in turn comprises a pattern node 51A including five neurons corresponding to those in the winner-take-all neural net 42, a context node 51B including neurons for retaining the internal state of the recurrent neural net 43, and a direction node 51C including neurons to which the control circuit 24 gives an instruction of which direction to take.

The output layer 53 comprises a pattern node 53A including neurons corresponding to the five land marks, and a context node 53B corresponding to the context node 51B in the input layer 51. Each neuron in the intermediate layer 52 is connected to each node in both the input layer 51 and the output layer 53. The outputs of the neurons of the context node 53B in the output layer 53 are fed back to the neurons of the context node 51B in the input layer 51. With this arrangement, a context loop that internally reflects history is formed.

The recurrent neural net 43 predicts a next land mark to appear and outputs it through the output layer 53, when the winner-take-all neural net 42 provides an input corresponding to one land mark to the pattern node 51A in the input layer 51.

Figure 7:
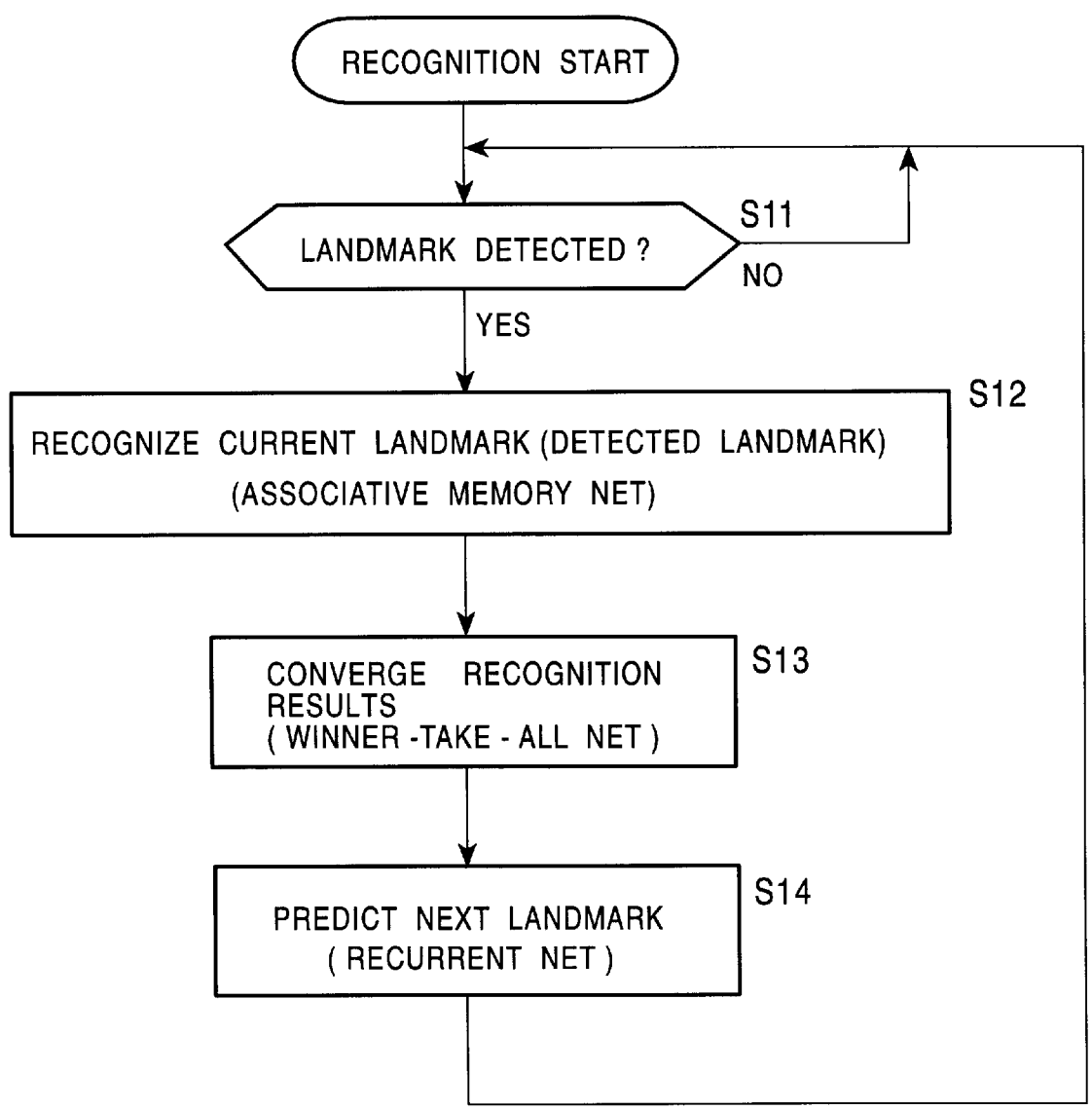
FIG. 7 is a flow diagram illustrating the neural net recognition unit 23 shown in FIG. 2.

Upon receiving the color image data from the quantizing circuit 25, the neural net recognition unit 23 performs the process shown in the flow diagram in FIG. 7.

In step S11, the neural net recognition unit 23 waits until any land mark is detected. In this embodiment, each of the land marks 1 to 5 is painted in a predetermined color. The neural net recognition unit 23 gives a YES determination at step S11 when color image data is input, and it goes to step S12.

In step S12, the neural net recognition unit 23 performs recognition process to the land mark just detected (current land mark). The recognition process is executed by the associative memory net 41 in the neural net recognition unit 23.

When the recognition process of the current land mark is complete in step S12, the neural net recognition unit 23 goes to step S13 where the winner-take-all neural net 42 performs a converging process to the recognition result obtained in step S12. More particularly, it identifies which one of the five land marks is recognized. The neural net recognition unit 23 goes to step S14 where the recurrent neural net 43 predicts a next land mark that is expected to appear in succession to the current one. The prediction result is presented on the display 14. The above process is repeated each time a land mark is detected.

Now suppose that the image of each of the five land marks 1 to 5 as a reference object for recognition is learned (stored) as a connectivity weight in the associative memory net 41. When the correlation memory net 41 receives a pattern of the land mark 2 quantized through the quantizing circuit 25, the red quantized data, green quantized data and blue quantized data of the land mark 2 are fired at their positions in the fields 41R, 41G and 41B, respectively. The winner-take-all neural net 42 determines the land mark corresponding to the fire condition of each field, and fires a neuron corresponding to one land mark based on the determination result. In this case, the neuron corresponding to the land mark 2 is fired.

In the pattern node 51A in the input layer 51 of the recurrent neural net 43, a neuron corresponding to the land mark 2 is fired in response to the fired neuron of the winner-take-all neural net 42. The control circuit 24 determines which way to take, to the left or to the right, and feeds a signal indicative of the determined direction to the direction node 51C in the input layer 51. As shown in FIG. 5, the neuron for the left direction is fired. The recurrent neural net 43 predicts a next land mark in succession to the current land mark 2, and the prediction result is output to the pattern node 53A in the output layer 53. Referring to FIG. 3, when the direction to go is the left with the land mark 2 detected, the next land mark is the land mark 5. As shown in FIG. 5, the neuron No. 5 corresponding to the land mark 5 is thus fired.

Upon receiving the data input about the predicted land mark from the neural net recognition unit 23, the control circuit 24 outputs a corresponding land mark number to the display 14 to be presented thereon. In this case, No. 5 is presented on the display 14. Thus, a user knows that the land mark 5 is the next one.

When the neuron corresponding to the land mark 2 is fired in the pattern node 51A in the input layer 51 of the recurrent neural net 43, and when the neuron corresponding to the right direction in the direction node 51C is fired, the land mark 3 is the next one with the robot 11 steering to the right as shown in FIG. 3, and a No. 3 neuron corresponding to the land mark 3 is fired in the pattern node 53A in the output layer 53.

If the land mark 4 is similar to the land mark 1 in color, it is unclear as to which one, land mark 1 or land mark 4, is recognized. In this embodiment, however, since the recurrent neural net 43 includes the context loop, in which the internal history is reflected. Thus, the time-series order of appearance of the land marks 1 to 4, namely a state transition is also recognized.

More particularly, the land mark 3 appears earlier, followed by the land mark 4, and the land mark 5 appears earlier, followed by the land mark 1, as shown in FIG. 3. With its context nodes 51B, 53B, the recurrent neural net 43 determines what state the current state matches. Therefore, if the land mark 3 is the current one, the next land mark to be input is the land mark 4 rather than the land mark 1. Similarly, if the land mark 5 is the current one, the predicted land mark is the land mark 1 rather th an the land mark 4.

The present invention has been discussed in connection with the mobile robot which autonomously moves along its path and determines its current position by recognizing the land marks. Besides robot applications, the present invention may be implemented in any type of applications which recognizes a given object.

In the object recognition apparatus and method according to the first and second aspects of the present invention, the quantized data stored is compared with the quantized data derived from the color image data of the reference object, in each of beforehand segmented areas of a finite number on the color space on an area-by-area basis. The recognition apparatus presents an enhanced learning capability, and stores and recognizes a number of reference objects.

What is claimed is:

1. An object recognition apparatus for recognizing which of a plurality of possible reference objects is a particular reference object, comprising:

imaging means for imaging the particular reference object to be recognized and outputting color image data corresponding to the particular reference object, quantizing means for quantizing individually the color image data of the particular reference object output by the imaging means, as data falling within one of segmented areas of a finite number in a predetermined color space, storing and learning means for learning and then storing, on an area-by-area basis, the individually quantized data provided by the quantizing means, comparison means for comparing, on an area-by-area basis, the area-by-area quantized data stored individually in the storing and learning means with the area-by-area quantized data provided by the quantizing means, and determining means for exclusively determining which of the plurality of possible reference objects is the particular reference object based on the collective comparison result for the areas provided by the comparison means that makes comparisons on an area-by-area basis.

2. An object recognition apparatus according to claim 1, wherein the color space is defined by hue and chroma from among the three attributes of color, namely, hue, chroma and brightness.

3. An object recognition apparatus according to claim 1, wherein the storage means stores, on an area-by-area basis, the quantized data corresponding to the reference object to be recognized, as a connectivity weight between neurons in a neural net, the comparison means compares, on an area-by-area basis, the quantized data in terms of the fire condition of each neuron in the neural net, and an associative memory net that recognizes a reference object currently being imaged is constituted by the storage means and the comparison means.

4. An object recognition apparatus according to claim 3, wherein the associative memory net comprises a Hopfield neural net.

5. An object recognition apparatus according to claim 1, wherein the determining means comprises a winner-take-all type neural network for converging the comparison result provided by the comparison means.

6. An object recognition apparatus according to claim 1 further comprising a recurrent neural network which has a context loop which internally reflects history to learn the time-series order of appearance of the particular reference object determined by the determining means and to predict another particular reference object that is one of the plurality of possible reference objects to subsequently appear based on the determination result of the determining means.

7. An object recognition apparatus according to claim 1, wherein the particular reference object is used as a land mark by which a mobile robot moving autonomously along a path determines the current position of the mobile robot.

8. An object recognition method for recognizing which of a plurality of possible reference objects is a particular reference object, comprising the steps of:

quantizing means for quantizing individually the color image data which is obtained by imaging, the particular reference object to be recognized, as data falling within one of segmented areas of a finite number in a predetermined color space, learning and then storing the individually quantized data provided by the quantizing means, on an area-by-area basis, comparing, on an area-by-area basis, the area-by-area quantized data stored individually with the area-by-area quantized data obtained through imaging, and exclusively determining which of the plurality of possible reference objects is the particular reference object based on the collective comparison result for the areas resulting from the area-by-area basis comparison.

9. An object recognition method according to claim 8 further comprising the step of learning the time-series order of appearance of the particular reference object exclusively determined, based on the comparison result through the area-by-area comparison, and predicting another reference object that is one of the plurality of possible reference objects to subsequently appear, based on the determination result.

\* \* \* \* \*